United States Patent [19]

Verdeau et al.

[11] Patent Number: 4,597,935
[45] Date of Patent: Jul. 1, 1986

[54] NUCLEAR REACTOR HAVING A CONTROL CLUSTER GUIDE

[75] Inventors: Jean-Jacques Verdeau, Gif-sur-Yvette; Michel R. Le Helloco, Paris, both of France

[73] Assignee: Framatome & Cie, Courbevoie, France

[21] Appl. No.: 718,205

[22] Filed: Apr. 2, 1985

Related U.S. Application Data

[63] Continuation of Ser. No. 353,996, Mar. 2, 1982, abandoned.

[30] Foreign Application Priority Data

Mar. 13, 1981 [FR] France ................ 81 05037

[51] Int. Cl.⁴ .................................................. G21C 7/10
[52] U.S. Cl. ..................... 376/353; 376/224; 376/399
[58] Field of Search ............... 376/207, 219, 224, 239, 376/281, 327, 347, 353, 377, 389, 399, 439, 443

[56] References Cited

U.S. PATENT DOCUMENTS

| | | | |
|---|---|---|---|
| 3,207,670 | 9/1965 | Fortescue et al. | 376/353 |
| 3,247,068 | 4/1966 | Schluderberg et al. | 376/399 |
| 3,481,832 | 12/1969 | Rickert | 376/353 |
| 3,519,535 | 7/1970 | French et al. | 376/224 |
| 3,595,748 | 7/1971 | Frisch et al. | 376/224 |
| 3,607,629 | 9/1971 | Frisch et al. | 376/224 |
| 3,663,367 | 5/1972 | Calvin | 376/439 |
| 3,849,257 | 11/1974 | Bevilacqua | 376/224 |
| 3,940,311 | 2/1976 | Frisch et al. | 376/224 |
| 3,977,939 | 8/1976 | Frisch et al. | 376/224 |
| 4,033,814 | 7/1977 | Bregeon et al. | 376/399 |
| 4,092,216 | 5/1978 | Aubert | 376/353 |

Primary Examiner—Charles T. Jordan
Assistant Examiner—Richard Klein
Attorney, Agent, or Firm—Pollock, Vande Sande & Priddy

[57] ABSTRACT

Control cluster guide devices, for light water cooled nuclear reactors, including housings. The reactor includes means outside the core for guiding control clusters (7) during their movements.

The housings (12) are associated respectively with the several control clusters (7) and comprise plates which ensure discontinuous guidance at intermediate levels for the individual pencils and an associated spider, each housing including for continuous of the individual pencils, tubes which connect two tube plates for the pencils to pass through, which are proper to the housing, the one terminating it and the other forming a positioning flange on the core plate.

4 Claims, 6 Drawing Figures

NUCLEAR REACTOR HAVING A CONTROL CLUSTER GUIDE

This application is a continuation of application Ser. No. 353,996, filed 3-2-82 now abandoned.

FIELD OF THE INVENTION

The invention refers to the achievement of the guidance of the control clusters in a nuclear reactor when the design of the reactor as a whole is such that the regulation of the reactivity is carried out by movement of control clusters each consisting of a number of absorbent pencils operated by one and the same common rod and movable in tubes which provide the skeleton of the fuel elements forming the core of the reactor. This arrangement is encountered in particular in light-water reactors in which the fuel elements are in turn assemblies formed of a large number of pencils of small diameter and parallel with one another, supported laterally by grids connected to tubes which provide the skeleton of the fuel element and enable the absorbent pencils to be introduced by movement of the control cluster. In order to clarify the vocabulary which will be employed below, it is well to remember in addition that in this species of reactor what is called "the spider" is the piece which at the top end of the control cluster, always outside the corresponding fuel assembly, joins the several absorbent pencils by radial arms to the common operating rod.

BACKGROUND OF THE INVENTION

The operation of the control clusters implies that the absorbent pencils can be removed entirely outside the core, whereas they are very long, of a length substantially equal to that of the fuel assemblies and without any other connection between them than at their top end where there is the spider. This is what renders indispensable the guidance of the clusters and even of each absorbent pencil individually over the whole length of their movement above the core.

In order to provide this guidance, one conventionally employs tubular housings, also called "guide tubes," which are of sufficient length to cover the whole length from a core plate which defines the upper boundary of the core and which only the absorbent pencils of the control cluster pass through in order to penetrate into the fuel assemblies, up to an upper support plate which carries the weight of the guide tubes.

As they thus form part of what is called the upper internal equipment of the reactor, the guide housings are subjected to the primary cooling fluid which leaves the fuel assemblies vertically at the top end of the core in order then to be directed towards the outlets at the side through which it leaves the vessel which contains the core. Hence they are situated in a zone of great turbulence. Consequently, not only must the housings ensure effective guidance of the absorbent pencils so that they may be introduced, at the time of an emergency shutdown, for example, as rapidly as possible between the fuel pencils, but in addition they must satisfy severe demands upon their mechanical strength. They must in particular be resistant in torsion and in bending; in short, they must withstand large radial and vibratory forces which result from the turbulence of the primary cooling fluid, as well as possible forces due to seismic shocks. They must also be able to withstand abrupt variations in pressure without deformation, especially in the event of rupture of pipework in the primary circuit. Again, they participate in the discharge and the deflection of the primary fluid which enters the interior through the orifices for passing through the absorbent pencils of the control cluster, and they must do so while causing the least possible loss of pressure.

As a function of these essentials, it has already been proposed to reinforce the individual guidance of the absorbent pencils close to the bottom end of the housings. In one known realization, described especially in French Pat. No. 2.397.043, a guide device is employed, which comprises besides the housings themselves and inside each of them horizontal crossbars uniformly distributed over the height of the housing, with in addition in the bottom zone of the housing a set of split vertical tubes and vertical plates directed radially which join horizontal crossbars together so as to ensure longitudinal guidance which is continuous in this zone, while letting the absorbent pencils and even the spider pass freely. The longitudinal slits which enable the spider to pass through considerably weaken the mechanical strength of the tubes. In addition their performance is limited by the existence of a pressure gradient in a horizontal plane which, because the tubes are open, tends to apply the absorbent pencil against the wall of the tube, thereby causing wear by friction. In order to limit this phenomenon, openings for discharge of the fluid are provided in the radial plates arranged between the tubes.

In accordance with another solution (French Pat. No. 73-23490, published under the No. 2,202,339), the top plate of the core is doubled by an intermediate plate situated at a level higher than the region of strongest turbulence of the primary fluid, in practice above the plane of the pipe stubs in the vessel containing the core, which provide the inlet and outlet of the cooling fluid. The intermediate plate is not traversed by the housings, but only by tubes which provide the individual guidance of the absorbent pencils at the same time as they play the part of crosspieces holding the two plates (the core plate and the intermediate plate) solidly together. Hence in this case the housings themselves remain outside the zone of strongest turbulence, as does the portion comprising the spider and the operating rod for the control rods. This solution is, however, only possible with tubes of relatively large diameter, capable of displaying the mechanical strength indispensable for their part of cross pieces. Hence it is not applicable to the guidance of control rods having absorbent pencils of small diameter. This disadvantage is not completely avoided in a variant upon this solution described in French Patent Application No 73-44815, published under No. 2,254,859, in which the intermediate plate is lowered and equipped with orifices for passing through the cooling fluid, so that the circulation remains substantially a rising one at this level.

In order to alleviate the disadvantages of the various known guide devices recalled above, the invention proposes a new device which has the advantage of enabling the combination especially of great rigidity, less sharing of the absorbent pencils in the wear and less elaborate manufacture.

SUMMARY OF THE INVENTION

The object of the invention is thus a nuclear reactor including clusters for control of the reactivity, each formed of a plurality of absorbent pencils movable vertically through a core plate forming the upper boundary of the reactor core and connected together by a spider having arms radial to a common axial operating rod, and means outside the core, for guidance of the control clusters in their movements, the said means including guide housings associated respectively with the several control clusters and inside each housing plates which ensure discontinuous guidance at intermediate levels for the individual pencils and the spider. Each characterized in that each housing includes, for continuous guidance of the individual pencils, tubes which connect two tube plates for the pencils to pass through, which are proper to the housing, the one terminating it and the other forming a positioning flange on the said core plate.

The tubes at the bottom end of the housings are preferably devoid of any side opening along their entire length between the two tube plates. They are accordingly stronger for less thickness. On the other hand, one thus avoids making a horizontal pressure gradient act upon the pencils at this level, which would favor their rubbing and wear against the inner face of the tube. Nevertheless the primary cooling fluid leaving the core through the core plate flows freely in the volume unoccupied by the tubes and between the housings, much more freely than in prior art devices. Hence the housings themselves do not have to be passed through by a significant flow of primary fluid, so that advantageously they are pierced only with openings for pressure-equalisation which do not destroy their strength. Overall the pressure losses due to the device for guidance of the control clusters are relatively low.

In order to avoid encouraging a rising circulation in the housings, it is advantageous if the tube plates terminating the housings do not in practice include openings other than those which enable the absorbent pencils to pass through into the guide tubes. As opposed to the intermediate plates for discontinuous guidance, situated inside each housing, the terminal plate does not allow the spider to pass through. On the contrary, the positioning flanges on the core plate are advantageously pierced with wide openings outside the tubes.

BRIEF DESCRIPTION OF THE DRAWINGS

A particular embodiment of a reactor having guidance of control cluster will now be described in greater detail by way of example. This description which is in no way restrictive refers to FIGS. 1 to 6 in which.

DESCRIPTION OF PREFERRED EMBODIMENT

The reactor being considered is a reactor of the light water type whose core is enclosed in a vessel containing pressure and having the cooling water passing through it, in the upward direction.

Figure 1:
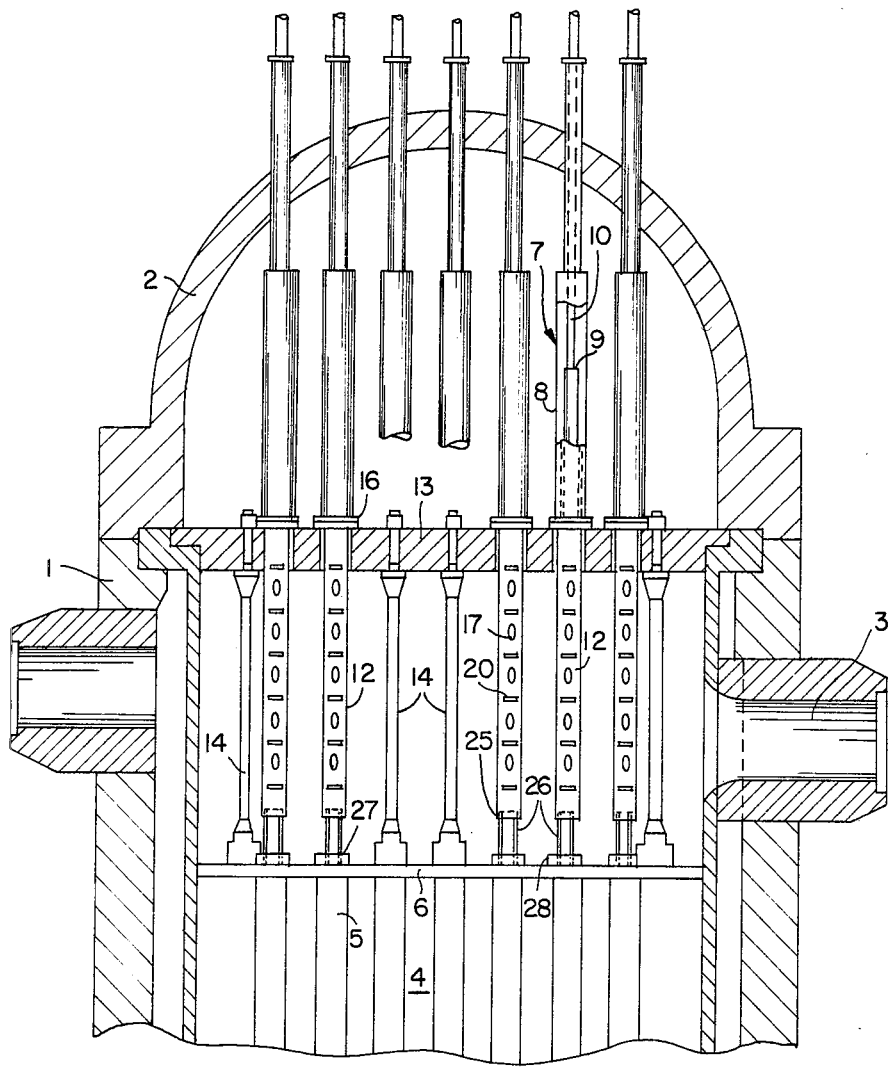
FIG. 1 represents a general vertical section of the upper portion of the reactor.

As the invention relates to the achievement of the guidance above the core of the clusters for control of the reactivity, in FIG. 1 only the upper portion of the reactor has been shown. However, there are to be seen partially the core 4 and the vessel 1 with its cover 2 and at the side one of the pipe stubs 3 for the outlet of the water.

The core consists as usual of a set of fuel asemblies 5 placed side by side, each formed of a large number of vertical pencils of fuel material. The upper boundary of the core, just above the fuel assemblies, is defined by a core plate 6. The regulation of the reactivity in operation is ensured by introducing control clusters to a greater or lesser extent into certain of the core assemblies. These control clusters 7 each consist of a number of pencils 8 of absorbent material, connected together at their top ends by a spider 9 having radial arms and integral with an operating rod 10. The clusters are manipulated from outside the vessel so as to move the absorbent pencils longitudinally between the fuel pencils of the corresponding assembly.

The core plate 6 is pierced with openings which on the one hand enable the absorbent pencils to pass through to penetrate into the core and on the other hand enable the cooling water to leave the core in order to be directed next towards the pipe stubs 3 which are located at a level higher thab that of the core plate 6.

Above the core the movements of the control clusters are guided by oblong housings 12 suspended in the vertical position from an upper supporting plate 13 which transfers the weight of the whole of the device for guidance of the control clusters over to the vessel 1. Apart from the housings 12, the core plate 6 and the upper supporting plate 13 are connected together by columns 14.

Figure 3:
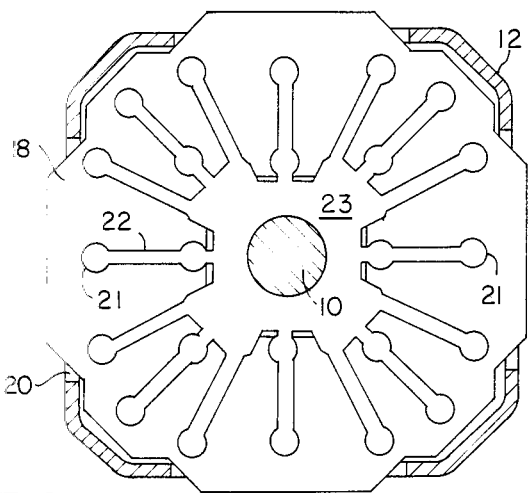
FIG. 3 is a cross-section of this device along line III—III in FIG. 2.

Each housing 12 surrounds the whole of the pencils of the control cluster, the guidance of which it provides. It passes through the upper supporting plate 13 in a bore cut for this purpose and it is attached to it by a bolted flange 16. It is pierced at the side with holes 17 distributed over its full height, which have the role of ensuring a balancing of pressure between the inside and the outside of the housing. At various levels at regular intervals intermediate guide plates 18 are mounted across the housing. Each is engaged in the four faces of the housing through windows 20 cut in the wall of the housing; it is welded to the housing along these windows. The intermediate plates 18 provide inside the housing for the various parts of the control cluster a guidance which is discontinuous over the height of the device. They include for this purpose (FIG. 3) circular holes 21 for passing through the individual absorbent pencils, and secondly radial slits 22 connecting the holes 21 together and to a wide central opening 23, which also enables the passing through and guidance of the spider and the operating rod.

Figure 4:
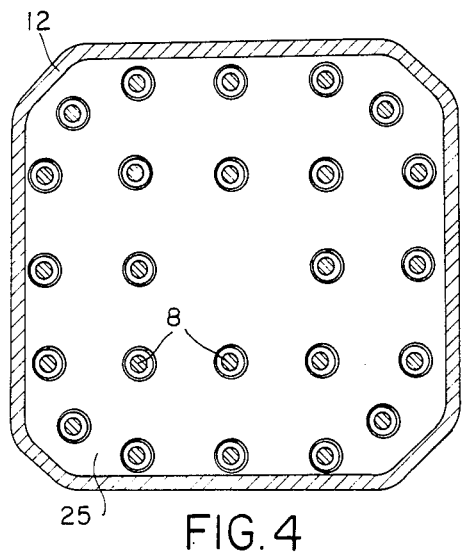
FIG. 4 is another cross-section of the same device along line IV—IV in FIG. 2.

The same is not the case with the terminal plate 25 welded to the bottom end of the housing. This is a tube plate having only holes for the absorbent pencils to pass through (FIG. 4). Hence the spider cannot descend below the terminal plate 25, which is situated at a distance of the order, for example, of 200 mm above the core plate 6. Over this distance the guidance of the absorbent pencils is still provided individually, but in addition in a continuous manner. For this purpose, at the bottom end of the housing a group of tubes 26 is provided, which cover this distance.

Figure 5:
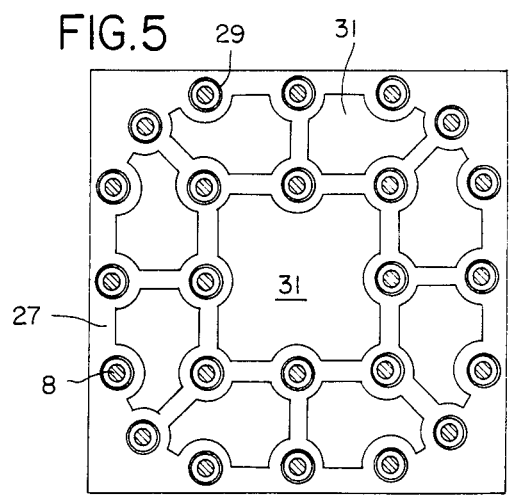
FIG. 5 is yet another cross-section of the same device along line V—V in FIG. 2.

The tubes 26 exhibit an internal diameter which, except for clearance, corresponds with the outer diameter of the pencils, and they are arranged in order to be passed through longitudinally by the several absorbent pencils respectively. They are welded and expanded at their top ends into the terminal plate 25 and at their bottom ends into another tubeplate 27. The latter is in fact a positioning flange for the whole of the housing with its group of tubes onto the coreplate 6. The positioning is ensured without rigid attachment by centering dowels 28 which are plugged into the coreplate and between which the housing is located. The flange 27 (FIG. 5) does not include only the holes 29 which correspond with the guide tubes for the individual pencils. In addition openings 31 are cut opposite openings in the core plate so as to allow passage of the cooling water which is leaving the core.

In the whole of the zone occupied by the tubes 26 the water then flows freely between the tubes. There is no communication transversely between the inside and the outside of the tubes. It is in this zone that the change in direction of the flow occurs towards the pipe stubs 3 for the outlet from the vessel. But the loss in pressure introduced by the device for guidance of the control clusters is minimal, while on the other hand the design of this device enables without difficulty a construction of high mechanical strength to withstand the forces due to the turbulence.

Figure 2:
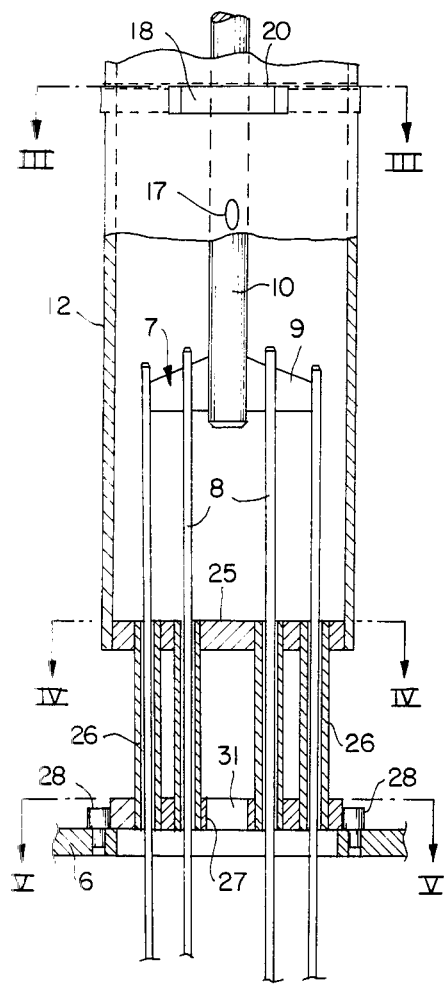
FIG. 2 represents in greater detail the device for guidance of the control clusters in longitudinal and hence vertical section.
Figure 6:
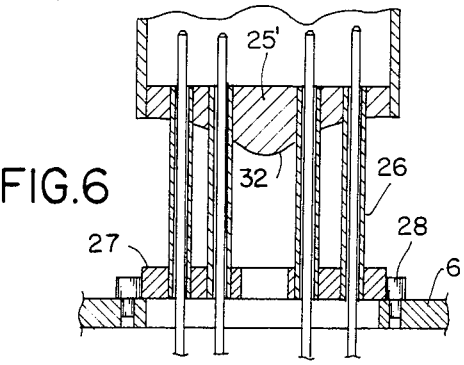
FIG. 6 represents a variant of the guide device.

FIG. 6 represents a variant embodiment of the upper tube plate of the guide device, or terminal plate. With the aim of encouraging a better distribution at the change in direction of the flow, the plate 25' may be formed of a unitary piece, the inner surface 32 of which exhibits a pointed profile. This profile may be of conical or divergent conical type. The plate 25' may also be formed of an assembly of a plane plate with a shaped plate. In other respects, the structure is identical with that of FIG. 2.

Similar assemblies of housings having tubes may be adapted for guiding the pencils of a control cluster which on its own covers a number of fuel assemblies, in the core.

We claim:

1. A water moderated and cooled nuclear reactor including clusters for control of reactivity, each formed of a plurality of absorbent pencils (8) movable vertically through a core plate (6) forming the upper boundary of a core of said reactor and connected together by a spider (7) having arms radial to a common axial operating rod (10), and means outside said core for guidance of said control clusters during their movements, said means comprising guide housings (12) each associated with a respective one of said control clusters and each having internal plates which assure discontinuous and individual guidance at intermediate levels for said pencils and said spider, each of said housings (12) being associated with tubes (26) devoid of side openings for continuous guidance of the individual pencils, said tubes (26) being each connected to an individual pair of two tube plates (25, 27) enabling passage of said pencils (8), one (25) of said tube plates constituting a lower closure plate for said housing and the other (27) of said tube plates being independent of the other plates of the other pairs and forming a positioning flange with respect to said core plate and being formed with outlet openings (31) for the passage of water leaving said reactor core through said core plate.

2. A reactor according to claim 1, wherein said one tube plate (25) is free of any openings other than those which enable said absorbent pencils (8) to pass through into said tubes (26) for continuous guidance.

3. A reactor according to claim 2, wherein said one tube plate (25) exhibits on its lower face a curved surface (32) protruding toward said positioning flange (27) and streamlined for causing progressive deflection of said water from a rising vertical flow into a transverse flow.

4. A water moderated and cooled nuclear reactor comprising
   (a) a core;
   (b) a core plate forming the upper boundary of said core;
   (c) a plurality of reactivity control clusters each comprising a common axial operating rod, a spider fast with said rod and a plurality of neutron absorbent pencils vertically movable through said core plate and connected to said operating rod by radial arms of said spider; and
   (d) a guiding structure located above said core plate for guiding said control clusters during the vertical movements thereof;
   (e) wherein said guiding structure comprises guide housings each associated with a respective one of said control clusters and each having internal plates for discontinuous and individual guidance of said pencils and spider at intermediate levels, and each of said guide housings is closed at the lower end thereof by a first tubular plate connected to a second tubular plate arranged for positioning by slidable centering means with respect to said core plate by a plurality of tubes each arranged for slidably receiving and guiding an individual one of said pencils, said second tubular plate being formed with openings for the passage of coolant flowing out of said core plate into a space outside of said housings, the first and second tubular plates associated with any one of said guide housings being independent of the first and second tubular plates of the other of said guide housings.

* * * * *